(12) United States Patent
Quan et al.

(10) Patent No.: US 12,352,979 B2
(45) Date of Patent: Jul. 8, 2025

(54) HEAD-MOUNTED DISPLAY DEVICE

(71) Applicant: BOE TECHNOLOGY GROUP CO., LTD., Beijing (CN)

(72) Inventors: Xudong Quan, Beijing (CN); Haoran Jing, Beijing (CN); Feng Zi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/551,961

(22) PCT Filed: Nov. 30, 2022

(86) PCT No.: PCT/CN2022/135380
§ 371 (c)(1),
(2) Date: Sep. 22, 2023

(87) PCT Pub. No.: WO2024/113220
PCT Pub. Date: Jun. 6, 2024

(65) Prior Publication Data
US 2025/0035939 A1    Jan. 30, 2025

(51) Int. Cl.
*G02B 27/01* (2006.01)
(52) U.S. Cl.
CPC ..... *G02B 27/0176* (2013.01); *G02B 27/0179* (2013.01); *G02B 2027/0143* (2013.01); *G02B 2027/0154* (2013.01)
(58) Field of Classification Search
CPC .............. G02B 27/017; G02B 27/0176; G02B 27/0179; G02B 2027/0143; G02B 2027/0154
See application file for complete search history.

(56) References Cited

U.S. PATENT DOCUMENTS

2019/0113760 A1* 4/2019 Tatsuta ............... G02B 27/0176
2019/0174041 A1* 6/2019 Wang ....................... A42B 3/04
2022/0091424 A1 3/2022 Baudou et al.

FOREIGN PATENT DOCUMENTS

| CN | 104522921 A | 4/2015 |
| CN | 205374872 U | 7/2016 |
| CN | 205374876 U | 7/2016 |

(Continued)

OTHER PUBLICATIONS

International Search Report and Written Opinion dated Aug. 14, 2023, for corresponding PCT Application No. PCT/CN2022/135380.

*Primary Examiner* — Cory A Almeida
(74) *Attorney, Agent, or Firm* — Kinney & Lange, P.A.

(57) ABSTRACT

A head-mounted display device is provided, which relates to a field of display device technology. The device includes: a display unit used to display a picture; a connection unit used to position the display unit in front of at least one eye of a user after the head-mounted display device is worn on a head of the user; a rotating shaft unit includes at least a first segment, a second segment, and a first adjusting member connecting the first segment and the second segment, where the first segment is connected to the connection unit, and the first adjusting member is used to change a relative position of the first segment and the second segment when the first adjusting member is subjected to an external force, so that the second segment drives the display unit to move to achieve a pupil distance adjustment.

16 Claims, 8 Drawing Sheets

(56) References Cited

FOREIGN PATENT DOCUMENTS

| | | |
|---|---|---|
| CN | 106764351 A | 5/2017 |
| CN | 207854018 U | 9/2018 |
| CN | 108873350 A | 11/2018 |
| CN | 109143590 A | 1/2019 |
| CN | 212647164 U | 3/2021 |
| CN | 113267892 A | 8/2021 |
| CN | 214540244 U | 10/2021 |
| CN | 113671713 A | 11/2021 |
| CN | 214630266 U | 11/2021 |
| CN | 114167617 A | 3/2022 |
| JP | 2008022236 A | 1/2008 |
| JP | 2012105117 A | 5/2012 |

* cited by examiner

HEAD-MOUNTED DISPLAY DEVICE

CROSS-REFERENCE TO RELATED APPLICATION

This application is a Section 371 National Stage Application of International Application No. PCT/CN2022/135380, filed on Nov. 30, 2022, entitled "HEAD-MOUNTED DISPLAY DEVICE", the content of which is hereby incorporated by reference in its entirety.

TECHNICAL FIELD

The present disclosure relates to a field of display device technology, and in particular, to a head-mounted display device.

BACKGROUND

Nowadays, with a rapid development of various 3D technology and AI technology industries, various display technologies have emerged in the market, such as AR Augmented Reality, VR Virtual Reality, MR Mixed Reality, and XR Extended Reality.

However, although a head-mounted display device based on any of the above display technologies may achieve screen display, it is impossible to meet requirements of users with different pupil distances and it is required to be customized according to pupil distances of the users.

SUMMARY

In view of the above issues, the present disclosure provides a head-mounted display device that may be adjusted for people with different pupil distances to achieve better display effects.

Embodiments of the present disclosure provides a head-mounted display device, including a display unit configured to display a picture; a connection unit configured to position the display unit in front of at least one eye of a user after the head-mounted display device is worn on a head of the user; a rotating shaft arm unit, including at least a first segment, a second segment, and a first adjusting member connecting the first segment and the second segment, where the first segment is connected to the connection unit, and the first adjusting member is configured to change a position of one of the first segment and the second segment with respect to the other one of the first segment and the second segment when the first adjusting member is subjected to an external force, so that the second segment drives the display unit to move to achieve a pupil distance adjustment.

According to embodiments of the present disclosure, the rotating shaft arm unit further includes a third segment, and the second segment is connected to the display unit through the third segment.

According to embodiments of the present disclosure, the rotating shaft arm unit further includes a second adjusting member, the second adjusting member is connected between the second segment and the third segment. The second adjusting member is configured to change a position of one of the second segment and the third segment with respect to the other one of the second segment and the third segment when the second adjusting member is subjected to an external force, so that the third segment drives the display unit to move to achieve a pupil distance adjustment.

According to embodiments of the present disclosure, the first adjusting member is a flexible member, and/or the second adjusting member is a flexible member.

According to embodiments of the present disclosure, the first adjusting member is a flexible metal member, the first segment includes a first rigid skeleton, the second segment includes a second rigid skeleton, the rotating shaft arm unit further includes a first flexible trim, and the first adjusting member is configured to across a through hole inside the first flexible trim to connect the first rigid skeleton and the second rigid skeleton.

According to embodiments of the present disclosure, the second adjusting member is a flexible metal member, the third segment includes a third rigid skeleton, and the rotating shaft arm unit further includes a second flexible trim, and the second adjusting member is configured to across a through hole inside the second flexible trim to connect the second rigid skeleton and the third rigid skeleton.

According to embodiments of the present disclosure, the rotating shaft arm unit further includes a third flexible trim, a first end of the third flexible unit is connected to the first rigid skeleton, a second end of the third flexible unit is connected to the third rigid skeleton, and a middle portion between the first end and the second end is connected to the second rigid skeleton.

According to embodiments of the present disclosure, the first adjusting member is a rotation shaft, and/or the second adjusting member is a rotation shaft.

According to embodiments of the present disclosure, the first adjusting member or the second adjusting member is a rotating shaft rotating around an axis or a ball shaft rotating around any direction, wherein the axis is perpendicular to a line between pupils of two eyes.

According to embodiments of the present disclosure, the head-mounted display device further includes a third rotation shaft configured to connect the connection unit and the rotating shaft arm unit, where the rotating shaft arm unit is configured to rotate around the third rotation shaft to adjust a position of the rotating shaft arm unit with respect to the connection unit.

According to embodiments of the present disclosure, the first segment includes a second shaft hole and a first limiting groove, the third rotation shaft includes a first shaft cover, including a first limiting protrusion, where the first limiting protrusion is matched with the first limiting groove; a second rotating shaft skeleton including a first side and a second side, where a first rotating shaft portion is provided on the second side, where the first side is connected to the connection unit, and the first rotating shaft portion is configured to be connected to the first shaft cover through the second shaft hole.

According to embodiments of the present disclosure, the third rotation shaft further includes: a first gasket sleeved on the first rotating shaft portion, and configured to lubricate and/or reduce noise when the first segment rotates around the first rotating shaft portion; and/or a second gasket sleeved on the first rotating shaft portion, and configured to perform a damping adjustment when the first segment rotates around the first rotating shaft portion.

According to embodiments of the present disclosure, the head-mounted display device further includes a fourth rotation shaft configured to connect the rotating shaft arm unit and the display unit, where the rotating shaft arm unit is configured to rotate around the fourth rotation shaft to adjust a position of the rotating shaft arm unit with respect to the display unit.

According to embodiments of the present disclosure, the third segment of the rotating shaft arm unit includes a third shaft hole and a second limiting protrusion, a transfer housing of the display unit includes a fourth shaft hole and a second limiting groove, and the fourth rotation shaft includes a second shaft cover; a third rotating shaft skeleton including a second rotating shaft portion, where the second rotating shaft portion is connected to the second shaft cover through the third shaft hole and the fourth shaft hole, and the second limiting protrusion is matched with the second limiting groove.

According to embodiments of the present disclosure, the fourth rotation shaft further includes a third gasket sleeved on the second rotating shaft portion and configured to lubricate and/or reduce noise when the third segment rotates around the second rotating shaft portion; and/or; and/or a fourth gasket sleeved on the second rotating shaft and configured to perform a damping adjustment when the third segment rotates around the second rotating shaft portion.

According to embodiments of the present disclosure, the head-mounted display device further includes a main control box unit configured to shoot a picture and communicate with the display unit; a sixth rotation shaft connecting the main control box unit and the connection unit, where the main control box unit is configured to rotate around the sixth rotation shaft to adjust a shooting angle.

According to embodiments of the present disclosure, a rear cover of the main control box unit includes a third limiting groove and a fifth shaft hole, and the sixth rotation shaft includes a third shaft cover including a third limiting protrusion, wherein the third limiting protrusion is matched with the third limiting groove; a fourth rotating shaft skeleton including a third side and a fourth side, where a third rotating shaft portion is provided on the fourth side, where the third side is connected to the connection unit, and the third rotating shaft portion is configured to be connected to the third shaft cover through a fifth shaft hole.

According to embodiments of the present disclosure, the sixth rotation shaft further includes:

a fifth gasket disposed between the third shaft cover and the rear cover; and/or a sixth gasket sleeved on the third rotating shaft portion, and configured to lubricate and/or reduce noise when the main control box unit rotates around the third rotating shaft portion; and/or a seventh gasket sleeved on the third rotating shaft portion, and configured to perform a damping adjustment when the main control box unit rotates around the third rotating shaft portion.

According to embodiments of the present disclosure, the connection unit includes an annular headband, and the head-mounted object unit includes a helmet, the annular headband is configured to be sleeved on the head-mounted object unit.

According to embodiments of the present disclosure, a protrusion of the annular headband is inserted into a groove of the helmet.

According to embodiments of the present disclosure, the connection unit further includes a fastener, and when the annular headband is sleeved on the helmet, the fastener is configured to across the annular headband to contact with the helmet.

BRIEF DESCRIPTION OF THE DRAWINGS

The above contents, other purposes, features, and advantages of the present disclosure will be clearer by the following description of embodiments of the present disclosures with reference to the accompanying drawings, in which.

It should be noted that for the sake of clarity, in the accompanying drawings used to describe the embodiments of the present disclosure, a size of an overall/local structure or an overall/local region may be enlarged or reduced, that is, these drawings are not drawn according to actual proportions.

DETAILED DESCRIPTION OF EMBODIMENTS

Embodiments of the present disclosure will be described below with reference to accompanying drawings. However, it should be understood that these descriptions are only illustrative and not intended to limit the scope of the present disclosure. In the following detailed description, for ease of explanation, many specific details are elaborated to provide a comprehensive understanding of embodiments of the present disclosures. However, it is clear that one or more embodiments may also be implemented without these specific details. In addition, in the following explanation, descriptions of well-known structures and techniques are omitted to avoid unnecessary confusion with concepts of the present disclosure.

The terms used herein are only intended to describe specific embodiments and are not intended to limit the present disclosure. The terms "comprise", "include", "contain", etc. used herein indicate the existence of the described features, steps, operations, and/or components, but do not exclude the existence or addition of one or more other features, steps, operations, or components.

All terms (including technical and scientific terms) used herein have meanings generally understood by those skilled in the art, unless otherwise defined. It should be noted that the terms used here should be interpreted as having the meaning consistent with the context of this specification, and should not be interpreted in an idealized or too rigid way.

In a case of using an expression similar to "at least one selected from A, B, or C", it should generally be interpreted in accordance with the meaning of the expression generally understood by those skilled in the art (for example, "a system having at least one selected from A, B, or C" should include, but not be limited to, a system having A alone, a system having B alone, a system having C alone, a system having A and B, a system having A and C, a system having B and C, and/or a system having A, B, and C, etc.).

Figure 1:
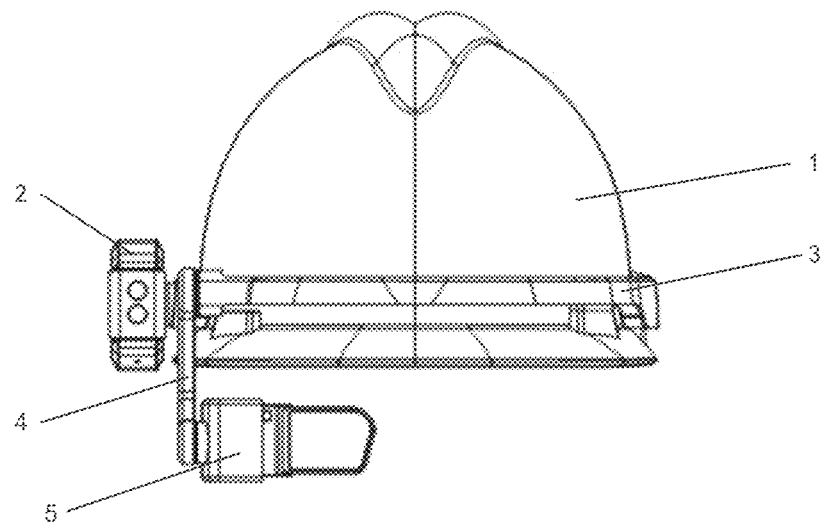
FIG. 1 schematically shows a main view of a usage state of a head-mounted display device according to embodiments of the present disclosure.
Figure 2:
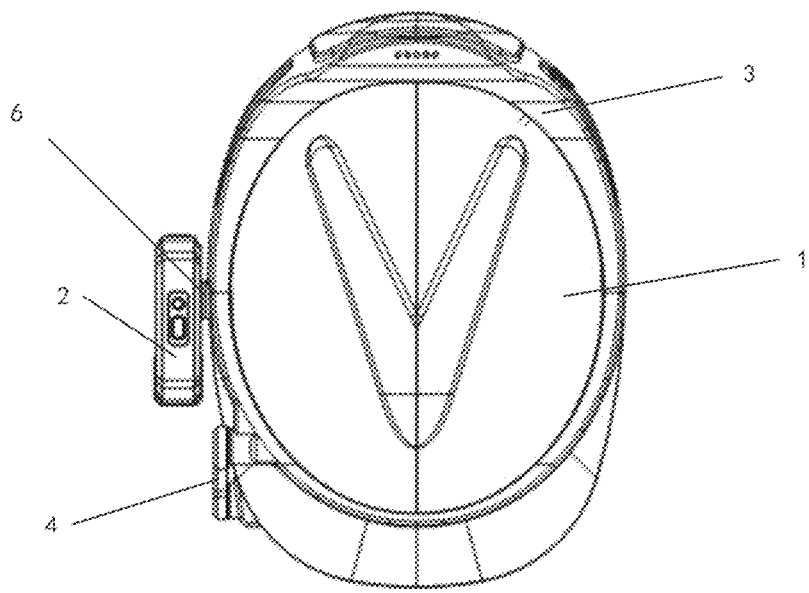
FIG. 2 schematically shows a top view of the usage state of the head-mounted display device according to embodiments of the present disclosure.
Figure 3:
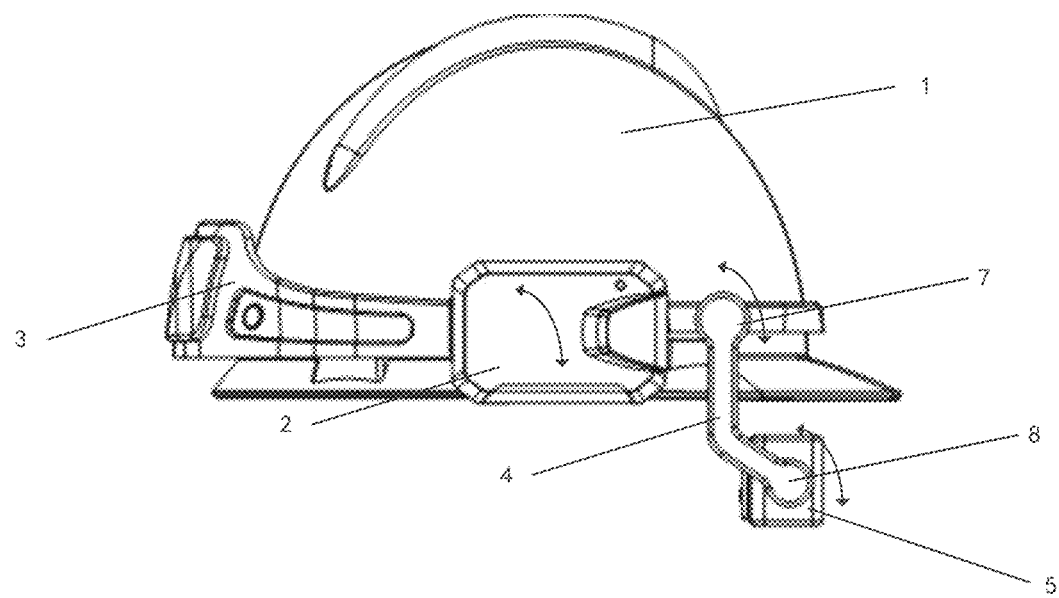
FIG. 3 schematically shows a left side view of the usage state of the head-mounted display device according to embodiments of the present disclosure.
Figure 4:
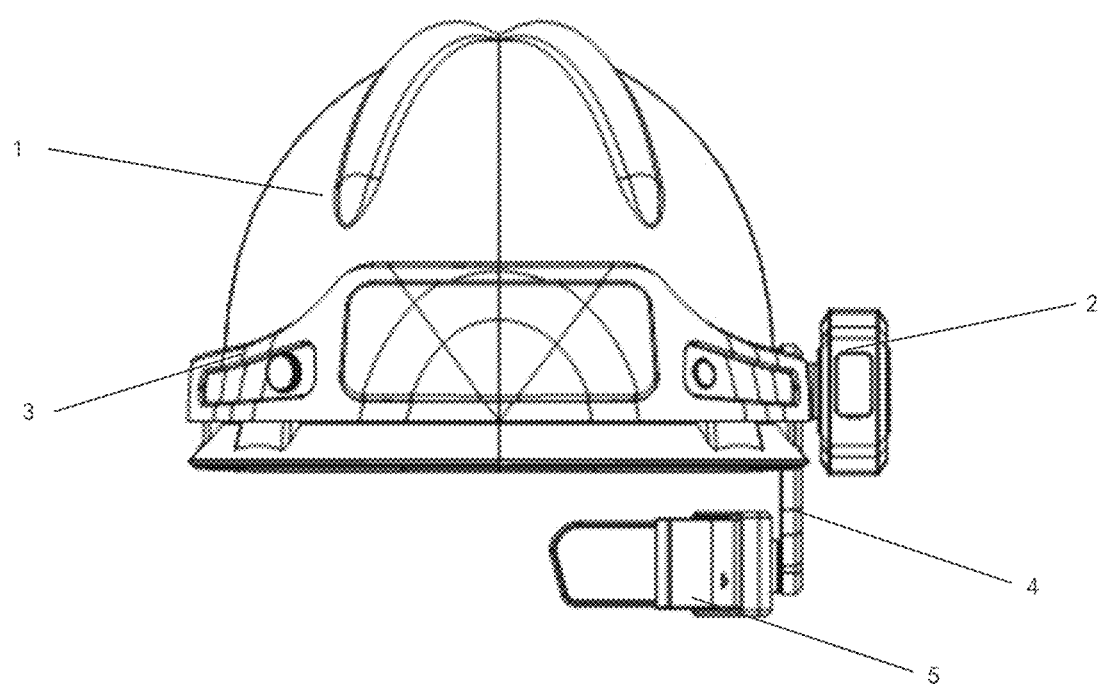
FIG. 4 schematically shows a rear view of the usage state of the head-mounted display device according to embodiments of the present disclosure.
Figure 5:
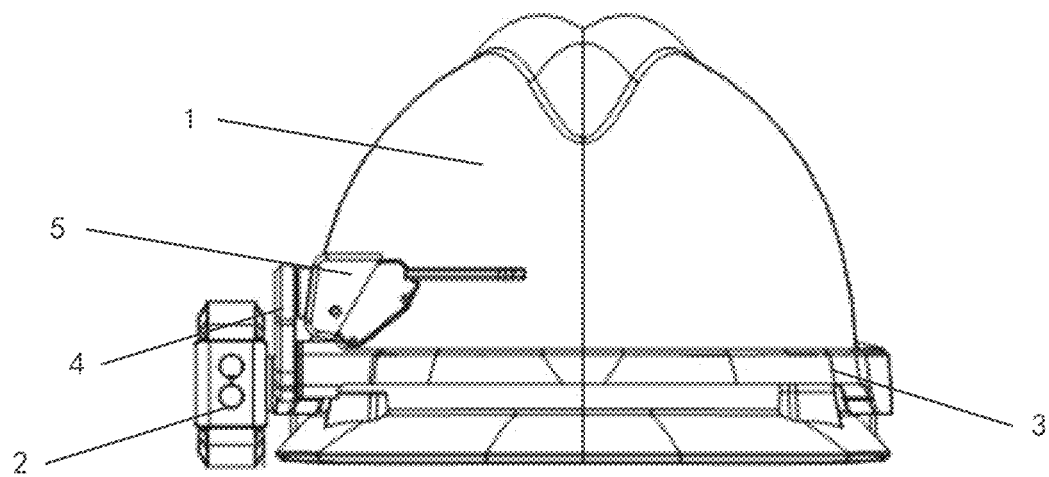
FIG. 5 schematically shows a main view of a folded state of the head-mounted display device according to embodiments of the present disclosure.
Figure 6:
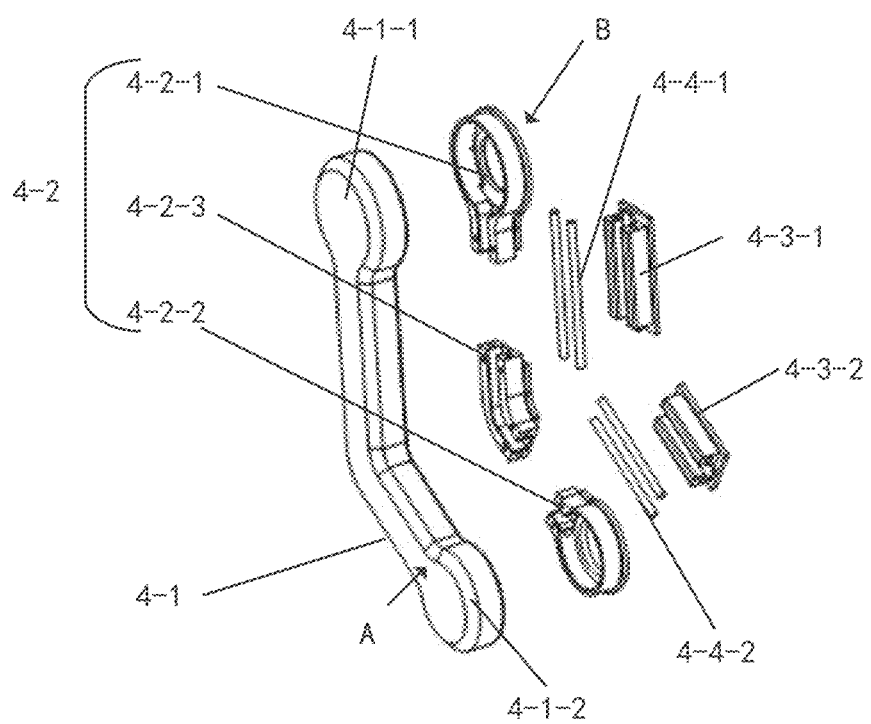
FIG. 6 schematically shows an exploded view of a rotating shaft arm unit according to embodiments of the present disclosure.

FIG. 1 schematically shows a main view of a usage state of a head-mounted display device according to embodiments of the present disclosure. FIG. 2 schematically shows a top view of the usage state of the head-mounted display device according to embodiments of the present disclosure. FIG. 3 schematically shows a left side view of the usage state of the head-mounted display device according to embodiments of the present disclosure. FIG. 4 schematically shows a rear view of the usage state of the head-mounted display device according to embodiments of the present disclosure. FIG. 5 schematically a main view of a folded state of the head-mounted display device according to embodiments of the present disclosure. FIG. 6 schematically shows an exploded view of a rotating shaft arm unit according to embodiments of the present disclosure.

With reference to FIGS. 1 to 6, the head-mounted display device of embodiments of the present disclosure includes a connection unit 3, a rotating shaft arm unit 4, and a display unit 5. The display unit 5 is used to display a picture. The connection unit 3 is used to position the display unit 5 in front of at least one eye of a user after the head-mounted display device is worn on a head of the user. The rotating shaft arm unit 4 includes at least a first segment 4-2-1, a second segment 4-2-3, and a first adjusting member 4-4-1 connecting the first segment 4-2-1 and the second segment 4-2-3. The first segment 4-2-1 is connected to the connection unit 3, and the first adjusting member 4-4-1 is configured to change a position of one of the first segment 4-2-1 and the second segment 4-2-3 with respect to the other one of the first segment 4-2-1 and the second segment 4-2-3 when the first adjusting member is subjected to an external force, so that the second segment 4-2-3 drives the display unit 5 to move to achieve a pupil distance adjustment.

In other embodiments, with reference to FIG. 6, the first segment may correspond to part 4-2-3 in FIG. 6, and the second segment may correspond to part 4-2-2 in FIG. 6. The first adjusting member may correspond to part 4-4-2 in FIG. 6. In other words, when the rotating shaft arm unit includes the first segment, the second segment and the first adjusting member, positions of the three may be changed according to actual needs.

For ease of understanding, the first segment 4-2-1, the second segment 4-2-3, and the first adjusting member 4-4-1 connecting the first segment 4-2-1 and the second segment 4-2-3 are further described below.

According to embodiments of the present disclosure, using rotating shaft arm unit 4, which includes at least the first segment 4-2-1, the second segment 4-2-3 and the first adjusting member 4-4-1 connecting the first segment 4-2-1 and the second segment 4-2-3, the first adjusting member 4-4-1 may be used to change the position of one of the first segment 4-2-1 and the second segment 4-2-3 with respect to the other one of the first segment 4-2-1 and the second segment 4-2-3, so as to cause the second segment 4-2-3 to move, thereby driving the display unit 5 to move. During a movement of the display unit 5, a position of the display unit 5 relative to a position of human eyes watching a picture changes, it is possible to achieve pupil distance adjustments of different pupil distances changing with position, thereby achieving a better display effect.

In some embodiments, the rotating shaft arm unit 4 also includes a third segment 4-2-2, and the second segment 4-2-3 is connected to the display unit 5 through the third segment 4-2-2.

For example, the second segment 4-2-3 may be directly connected to the third segment 4-2-2, such as a fixed connection by bonding or welding, or a detachable connection (the second segment 4-2-3 may be directly clamped or bolted to the third segment 4-2-2). The rotating shaft arm unit 4 is designed as a multi-segment structure including at least the first segment 4-2-1, the second segment 4-2-3 and the third segment 4-2-2, so that it is possible to improve a design flexibility of an overall structure of the rotating shaft arm unit 4.

In some embodiments, the second segment 4-2-3 and the third segment 4-2-2 may be provided with adjusting members. Specifically, the rotating shaft arm unit 4 also includes a second adjusting member 4-4-2. The second adjusting member 4-4-2 is connected between the second segment 4-2-3 and the third segment 4-2-2. The second adjusting member 4-4-2 is configured to change a position of one of the second segment 4-2-3 and the third segment 4-2-2 with respect to the other one of the second segment 4-2-3 and the third segment 4-2-2 when the second adjusting member is subjected to an external force, so that the third segment 4-2-2 drives the display unit 5 to move to achieve a pupil distance adjustment.

According to embodiments of the present disclosure, through a design that includes at least the first segment 4-2-1, the second segment 4-2-3 and the third segment 4-2-2, and disposing an adjusting member between any two segments, such as the first adjusting member 4-4-1 and the second adjusting member 4-4-2, it is possible to provide multiple adjustment positions to the user, so that it is convenient for the user to use at least one adjusting member for the pupil distance adjustment, which is more convenient.

Specifically, the above rotating shaft arm units of the first segment, the second segment, the third segment, the first adjusting member and the second adjusting member are only schematic structures of the present disclosure. More segments may be further added, and it is flexibly decided whether to add new adjusting members.

In some embodiments, the first adjusting member 4-4-1 includes a first flexible member, and/or the second adjusting member 4-4-2 includes a second flexible member. Among them, the flexible member includes a flexible element that may respectively have smaller stiffness in a plurality of directions and may deform when the flexible element is subjected to an external force. The user may apply a force to deform the first flexible member and/or the second flexible member, so as to drive the display unit 5 to move.

In some embodiments, the first flexible member includes a first flexible metal member, and/or the second flexible member includes a second flexible metal member. The first flexible metal member or the second flexible metal member deforms when being subjected to an external force.

For example, the flexible metal member (the first flexible metal member or the second flexible metal member) may include a material such as copper, iron, aluminum or alloys.

In some embodiments, the flexible metal member may include shapes that may bend and deform relative to the position of human eye, such as a strip, such as a metal rod or a metal wire. In other embodiments, the flexible metal member may be in a form of sheet, such as a rectangular metal sheet.

In some embodiments, the flexible metal member is telescopic along a length direction (such as an extension direction of the rotating shaft arm unit 4 from the connection unit to the display unit) of the flexible metal member. For example, the flexible metal member is a telescopic metal rod with a plurality of segments, so as to allow the users to adjust a length of the rotating shaft arm unit through telescoping. With reference to FIGS. 1 to 5, for different sizes of heads of different users, the relative position between the user's eyes and the display unit may be adjusted through a telescopic function. In addition, a size of the overall rotating shaft arm unit 4 may be reduced through the telescopic function, so as to facilitate folding storage.

In some embodiments, the rotating shaft arm unit 4 includes a rotating shaft arm skeleton 4-2, such as a first rigid skeleton 4-2-1, a second rigid skeleton 4-2-3 and a third rigid skeleton 4-2-2. For example, the rotating shaft arm skeleton 4-2 may be rigid. For example, in FIG. 6, the rotating shaft arm skeleton 4-2 has greater stiffness compared to other flexible members, so as to prevent the rotating shaft arm skeleton 4-2 from deforming when the user adjusts the pupil distance.

With reference to FIG. 6, the first segment 4-2-1 includes a first rigid skeleton 4-2-1, and the second segment 4-2-3 includes a second rigid skeleton 4-2-3. The rotating shaft arm unit 4 also includes a first flexible trim 4-3-1. The first flexible metal member is configured to across a through hole (not shown) inside the first flexible trim 4-3-1 to connect the first rigid skeleton 4-2-1 and the second rigid skeleton 4-2-3.

In some embodiments, the third segment 4-2-2 includes a third rigid skeleton 4-2-2. The rotating shaft arm unit 4 also includes a second flexible trim 4-3-2, and the second flexible metal member is configured to across a through-hole (not shown) inside the second flexible trim 4-3-2 to connect the second rigid skeleton 4-2-3 and the third rigid skeleton 4-2-2.

In some embodiments, the rotating shaft arm unit 4 also includes a third flexible trim 4-1-1. A first end 4-1-1 of the third flexible trim 4-1-1 is connected to the first rigid skeleton 4-2-1, a second end 4-1-2 of the third flexible trim 4-1-1 is connected to the third rigid skeleton 4-2-2, and a middle portion between the first end and the second end is connected to the second rigid skeleton 4-2-3.

With reference to FIG. 6, an A plane is parallel to a B plane, and a relative connection may include connecting a contour of the rotating shaft arm skeleton 4-2 and a contour of the third flexible trim 4-1 that are matched. After connection, a normal of the A plane is parallel to a normal of the B plane.

For example, materials of the first flexible trim 4-3-1, the second flexible trim 4-3-2 and the third flexible trim 4-1 may include rubber.

In some embodiments, with reference to FIG. 6, a flexible metal member is taken as an example of the metal wire. The first flexible metal member passes across the through hole of the first flexible trim member 4-3-1, and the second flexible metal member across the through hole of the second flexible trim member 4-3-2. Various parts of the rotating shaft arm skeleton 4-2 are connected in series and fixed with glue. Finally, the third flexible trim 4-1 is bonded on the series connected rotating shaft arm skeleton 4-2. An assembly of the rotating shaft arm is completed.

According to embodiments of the present disclosure, the rotating shaft arm skeleton 4-2 is connected to the first flexible trim 4-3-1 and the second flexible trim 4-3-2 through flexible members (such as metal wires). In this way, while ensuring a certain strength, the rotating shaft arm unit 4 may also bend slightly to the left or right (relative to the position of human eyes) in the direction of the normal of the A plane, so as to meet requirements of people with different pupil distances. At the same time, due to a multi-segment structure of 3+2 of the rotating shaft arm unit 4 (three parts of the rotating shaft arm skeleton 4-2 and two flexible members), it is possible to ensure that when the rotating shaft arm bends, a display state of the display unit 5 is maintained.

In some embodiments, in order to distinguish from the design of the flexible members, a first adjusting member 4-4-1 includes a first rotation shaft, and/or the second adjusting member 4-4-2 includes a second rotation shaft. In some embodiments, the first rotation shaft or the second rotation shaft includes: a rotating shaft rotating around an axis or a ball shaft rotating around any direction. An axis of the rotating shaft is perpendicular to a line L between pupils of two eyes. The description is expanded below by FIG. 7 and FIG. 8.

Figure 7:
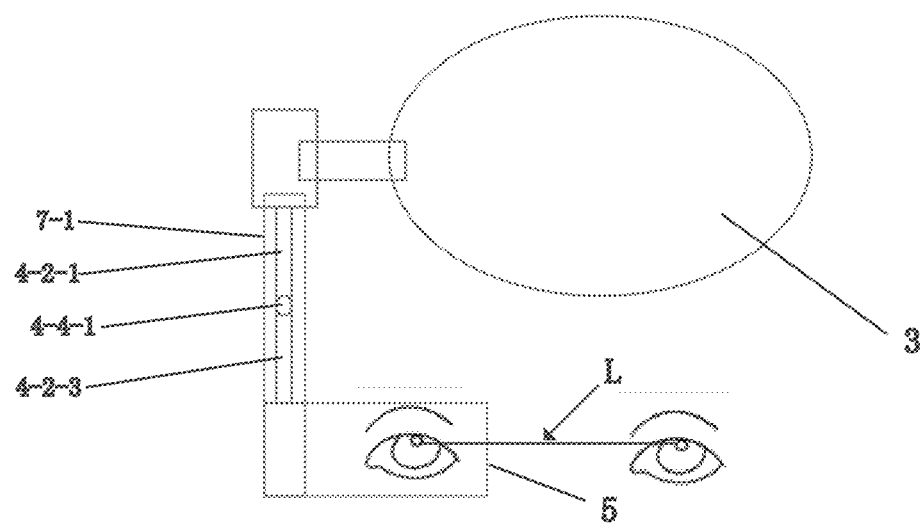
FIG. 7 schematically shows a structural diagram of a rotating shaft arm unit according to another embodiment of the present disclosure.

FIG. 7 schematically shows a structural diagram of a rotating shaft arm unit according to another embodiment of the present disclosure.

With reference to FIG. 7, the rotating shaft arm unit 4 includes a first segment 4-2-1, a second segment 4-2-3, and a first adjusting member 4-4-1 connected between the first segment 4-2-1 and the second segment 4-2-3. In addition, the rotating shaft arm unit 4 may also include a flexible skin 7-1 wrapping the first segment 4-2-1, the second segment 4-2-3 and the first adjusting member 4-4-1.

For example, the first segment 4-2-1 and the second segment 4-2-3 may be rigid skeletons, and the first rotation shaft may include a rotating shaft rotating around an axis or a ball shaft rotating around any direction.

For example, when the user adjusts the pupil distance, if the first rotation shaft is the rotating shaft rotating around the axis, the rotating shaft may be rotated, so that the second segment 4-2-3 drives the display unit 5 to move to an appropriate position. If the first rotation shaft is the ball shaft rotating around any direction, in addition to allowing the display unit 5 to move left and right, it is possible to move relative to the human eyes front and back in a direction perpendicular to the line L.

Figure 8:
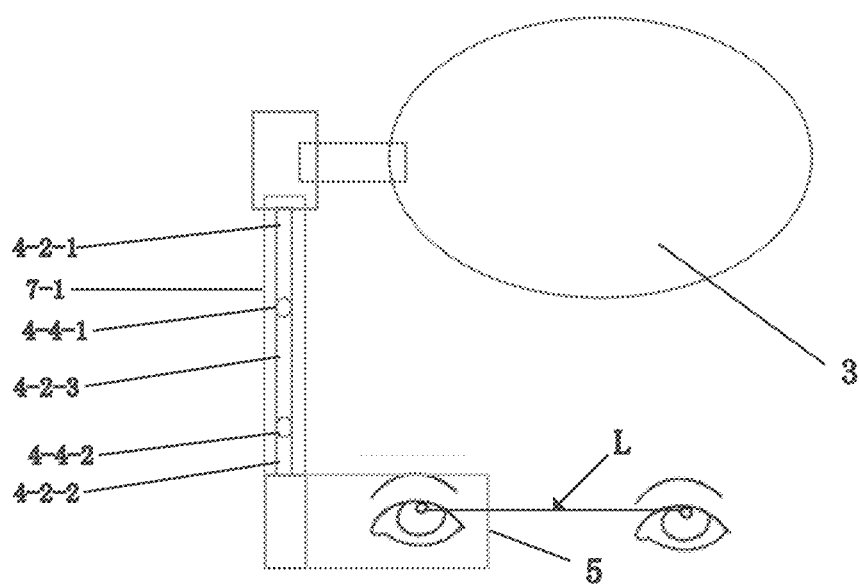
FIG. 8 schematically shows a structural diagram of a rotating shaft arm unit according to another embodiment of the present disclosure.

FIG. 8 schematically shows a structural diagram of a rotating shaft arm unit according to another embodiment of the present disclosure.

With reference to FIG. 8, the rotating shaft arm unit 4 may include a first segment 4-2-1, a second segment 4-2-3 and a first adjusting member 4-4-1 connected between the first segment 4-2-1 and the second segment 4-2-3, and may also a third segment 4-2-2 and a second adjusting member 4-4-2 connected between the second segment 4-2-3 and the third segment 4-2-2. In addition, the flexible skin 7-1 may wrap the first segment 4-2-1, the second segment 4-2-3, the third segment 4-2-2, the first adjusting member 4-4-1 and the second adjusting member 4-4-2.

For example, the third segment 4-2-2 may be a rigid skeleton, and the second rotation shaft may include a rotating shaft rotating around an axis or a ball shaft rotating around any direction.

For example, when the user adjusts the pupil distance, if the second rotation shaft is the rotating shaft rotating around the shaft, the rotation shaft may be rotated, so that the third segment 4-2-2 drives the display unit 5 to move to the appropriate position. If the second rotation shaft is the ball shaft rotating around any direction, in addition to allowing the display unit 5 to move left and right, it is possible to move relative to the human eyes front and back in a direction perpendicular to the line L.

Specifically, a structure of the first rotation shaft may be the same as a structure of the second rotation shaft, such as both being rotating shafts or both being ball shafts. The structure of the first rotation shaft may be different from the structure of the second rotation shaft, such as one of the first rotation shaft and the second rotation shaft is a rotating shaft and one of the first rotation shaft and the second rotation shaft is a ball shaft. The user may use the first rotation shaft and/or the second rotation shaft as required.

In some embodiments, with reference to FIGS. 6 to 8, in a case that the rotating shaft arm unit 4 has more than two adjusting members, the flexible member and the rotation shaft may be combined for use. For example, the first adjusting member 4-4-1 is a flexible member, and the second adjusting member 4-4-2 is a rotation shaft. Furthermore, the second adjusting member 4-4-2 may be a rotating shaft rotating around an axis or a ball shaft rotating around any direction. For another example, the first adjusting member 4-4-1 is a rotation shaft, and the second adjusting member 4-4-2 is a flexible member. Furthermore, the first adjusting member 4-4-2 may be a rotating shaft rotating around an axis or a ball shaft rotating around any direction. Thus, it is possible to achieve more methods of pupil distance adjustment.

Figure 9:
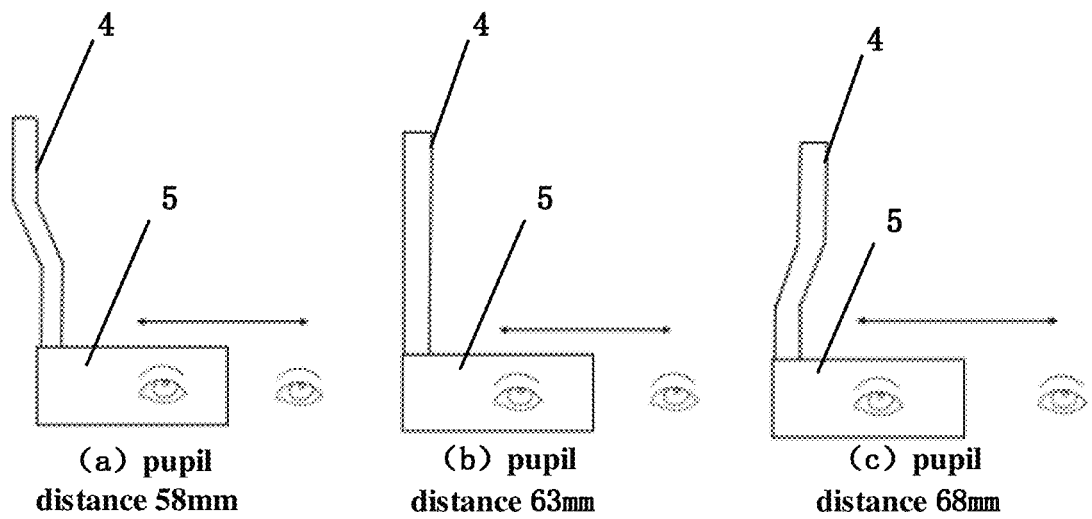
FIG. 9 schematically shows a pupil distance adjustment diagram according to embodiments of the present disclosure.

FIG. 9 schematically shows a pupil distance adjustment diagram according to embodiments of the present disclosure.

Due to differences in pupil distance between different users, it is required to align an optical display region of an optical machine directly in front of eyeball, and pupil distances of most users are concentrated between 63±5 mm. In this way, when in use, it is only required to bend slightly the rotating shaft arm unit 4 to the left or the right, so as to achieve pupil distance adjustment of the optical machine. FIG. 9 shows a schematic diagram of adjustments for pupil distances of 58 mm, 63 mm and 68 mm. For example, in an initial state of the rotating shaft arm unit 4, it may be applied to users with a pupil distance of 63 mm. When used by the user with a pupil distance of 58 mm, the display unit 5 may be moved to the right relative to the initial state. When used by users with a pupil distance of 63 mm, the display unit 5 may be moved to the left relative to the initial state. In this way, a stepless adjustment of pupil distance is achieved.

In a case that the rotating shaft arm unit 4 adopts a multi-segment structure design, such as a multi-segment structure of 3+2 mentioned above, the rotating shaft arm unit 4 may keep the display unit 5 in a horizontal state during bending. For example, in FIG. 9 (a) and FIG. 9 (c), by partially bending the two adjusting members, a relative position between the third segment and the display unit 5 remains unchanged.

Figure 10:
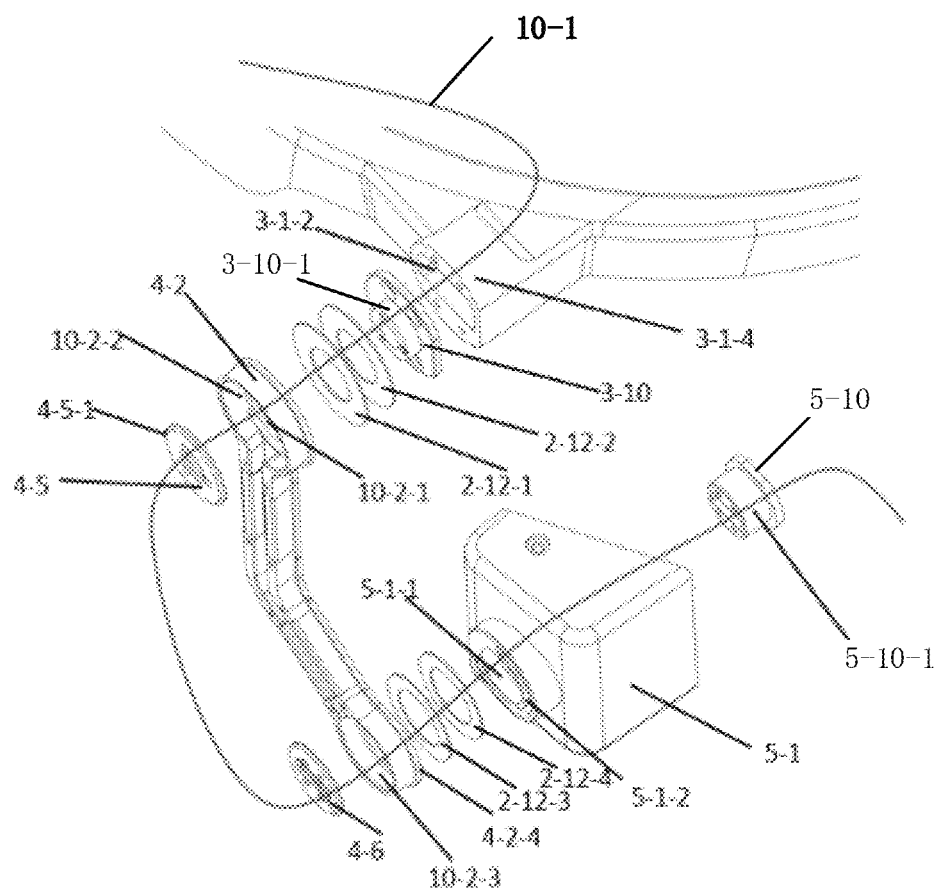
FIG. 10 schematically shows an exploded view of a third rotation shaft and a fourth rotation shaft according to embodiments of the present disclosure.

FIG. 10 schematically shows an exploded view of a third rotation shaft and a fourth rotation shaft according to embodiments of the present disclosure.

With reference to FIGS. 1 to 5, and FIG. 10, in some embodiments, the head-mounted display device also includes a third rotation shaft 7 used to connect the connection unit 3 and the rotating shaft arm unit 4. The rotating shaft arm unit 4 is configured to rotate around the third rotation shaft 7 to adjust a position of the rotating shaft arm unit 4 with respect to the connection unit 3.

With reference to FIG. 10, the first segment 4-2-1 includes a second shaft hole 10-2-1 and a first limiting groove 10-2-2. The connection unit 3 includes a first shaft hole 3-1-2 and a first rotating shaft skeleton 3-1-4. A third rotation shaft 7 mainly includes a first shaft cover 4-5, a second rotating shaft skeleton 3-10, a first gasket 2-12-1, and/or a second gasket 2-12-2. The first shaft cover 4-5 includes a first limiting protrusion 4-5-1, where the first limiting protrusion is matched with the first limiting groove 10-2-2. The second rotating shaft skeleton 3-10 includes a first side (near the connection unit 3) and a second side (near the first segment 4-2-1). A first rotating shaft portion 3-10-1 is provided on the second side, where the first side is connected to the connection unit 3, and the first rotating shaft portion 3-10-1 is configured to be connected to the first shaft cover 4-5 through the second shaft hole 10-2-1. Specifically, a data line 10-1 enters an interior of the rotating shaft arm unit 4 through the first shaft hole 3-1-2 and the second shaft hole 10-2-1. During assembly, a first limiting protrusion 4-5-1 of the first shaft cover 4-5 is clamped into the first limiting groove 10-2-2. The first shaft cover 4-5, the first rotating shaft skeleton 3-1-4, the second rotating shaft skeleton 3-10, the first gasket 2-12-1, and/or the second gasket 2-12-2 are fixed together with screws. Finally, a third rotation shaft with an angle limitation (limited by the first limiting groove 10-2-2) is formed.

With reference to FIG. 10, the first gasket 2-12-1 is sleeved on the first rotating shaft portion 3-10-1 and used to lubricate and/or reduce noise when the first segment 4-2-1 rotates around the first rotating shaft portion 3-10-1. And/or a second gasket 2-12-2 is sleeved on the first rotating shaft portion 3-10-1 and used to perform a damping adjustment when the first segment rotates around the first rotating shaft. A position between the first gasket 2-12-1 and the second gasket 2-12-2 in FIG. 10 may be interchanged.

With reference to FIG. 1 to FIG. 5, and FIG. 10, in some embodiments, the head-mounted display device also includes a fourth rotation shaft 8 used to connect the rotating shaft arm unit 4 and the display unit 5. The rotating shaft arm unit 4 is configured to rotate around the fourth rotation shaft 8 to adjust a position of the rotating shaft arm unit 4 with respect to the display unit 5.

With reference to FIG. 10, the third segment 4-2-2 includes a third shaft hole 10-2-3 and a second limiting protrusion 4-2-4. A transfer housing 5-1 of the display unit 5 includes a fourth shaft hole 5-1-1 and a second limiting groove 5-1-2. The fourth rotating shaft 8 mainly includes a second shaft cover 4-6, a third rotating shaft skeleton 5-10, a third gasket 2-12-3, and/or a fourth gasket 2-12-4. Specifically, a data line 10-1 enters the display unit 5 through the third shaft hole 10-2-3 and the fourth shaft hole 5-1-1. During assembly, the second rotating shaft portion 5-10-1 of the third rotating shaft skeleton 5-10 is used to across the fourth shaft hole 5-1-1 and the third shaft hole 10-2-3, and the second limiting protrusion 4-2-4 is clamped into the second limiting groove 5-1-2 to fit each other. The second shaft cover 4-6, the third rotating shaft skeleton 5-10, the third gasket 2-12-3, and/or the fourth gasket 2-12-4 are fixed together with screws. Finally, a fourth rotation shaft 8 with an angle limitation is formed.

With reference to FIG. 10, the third gasket 2-12-3 is sleeved on the second rotating shaft portion 5-10-1 and used to lubricate and/or reduce noise when the third segment 4-2-2 rotates around the second rotating shaft portion 5-10-1; and/or a fourth gasket 2-12-4 sleeved on the second rotating shaft and used to perform a damping adjustment when the third segment 4-2-2 rotates around the second rotating shaft portion 5-10-1. A position between the third gasket 2-12-3 and the fourth gasket 2-12-4 in FIG. 10 may be interchanged.

According to embodiments of the present disclosure, a multi-shaft design of the third rotation shaft 7 and/or the fourth rotation shaft 8 may be used to make the display unit 5 easy to store and freely switch a usage state (as shown in FIG. 1 to FIG. 5).

In some embodiments, the third rotation shaft 7 or the fourth rotation shaft 8 includes a structure as shown in FIG. 10, and may also be disposed as a ball shaft rotating around any direction. The following further describes that the third rotation shaft 7 and the fourth rotation shaft 8 are both ball shafts through FIG. 11.

Figure 11:
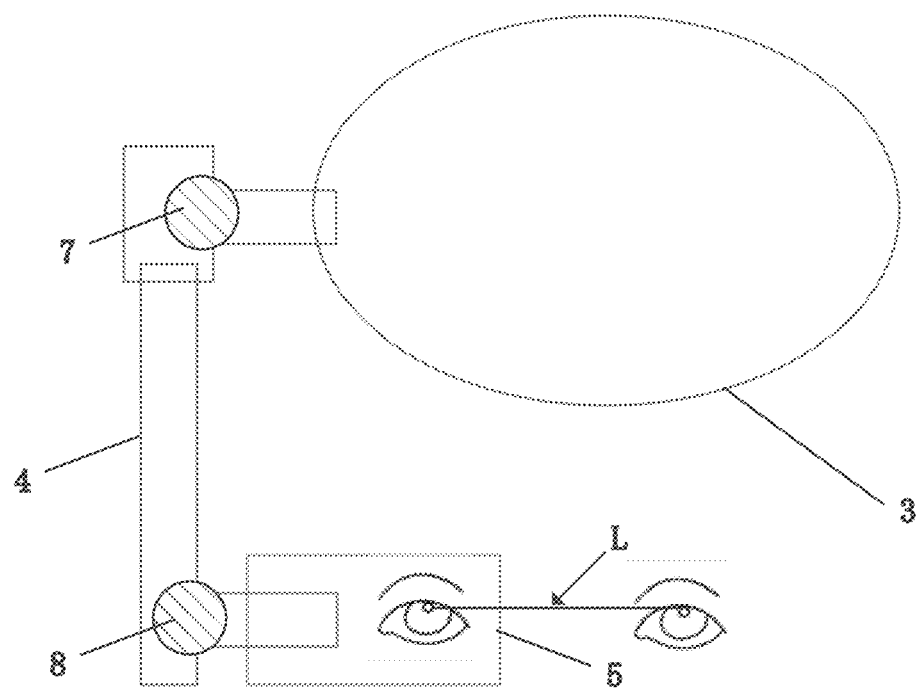
FIG. 11 schematically shows a structural diagram of a third rotation shaft and a fourth rotation shaft according to another embodiment of the present disclosure.

FIG. 11 schematically shows a structural diagram of a third rotation shaft and a fourth rotation shaft according to another embodiment of the present disclosure.

As shown in FIG. 11, the user may use the third rotation shaft 7 and the fourth rotation shaft 8 to achieve a function of the rotating shaft structure shown in FIG. 10, such as the display unit 5 is moved to a folded state as shown in FIG. 5.

In some embodiments, the rotating shaft arm unit 4 may all be rigid. The user may use the third rotation shaft 7 (such as the ball shaft) to rotate to drive the display unit 5 to move through the rotating shaft arm unit 4, thereby achieving the pupil distance adjustment.

In some embodiments, the rotating shaft arm unit 4 may also be a multi-segment structure as described above. The user may flexibly select the rotating shaft arm unit 4 and/or the third rotation shaft 7 to drive the display unit 5 to move, thereby achieving the pupil distance adjustment.

Specifically, for the third rotation shaft 7 and the fourth rotation shaft 8, the structure shown in FIG. 10 and the ball shaft structure shown in FIG. 11 may be combined, such as one is the rotating shaft and the other is the ball shaft.

Figure 12:
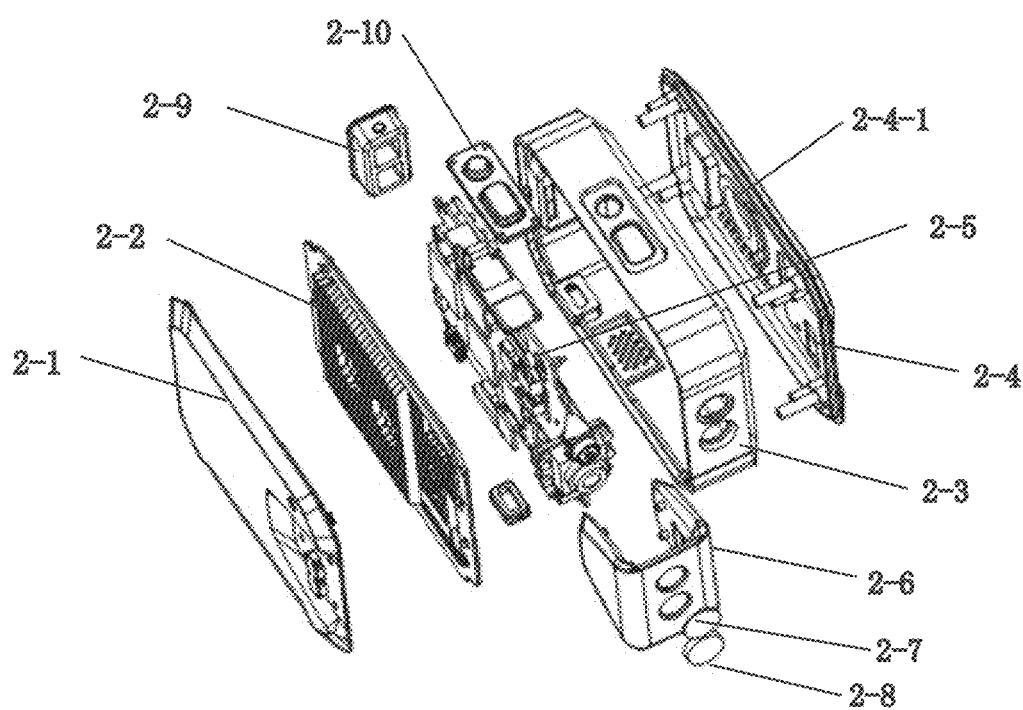
FIG. 12 schematically shows an exploded view of a main control box unit according to embodiments of the present disclosure.
Figure 13:
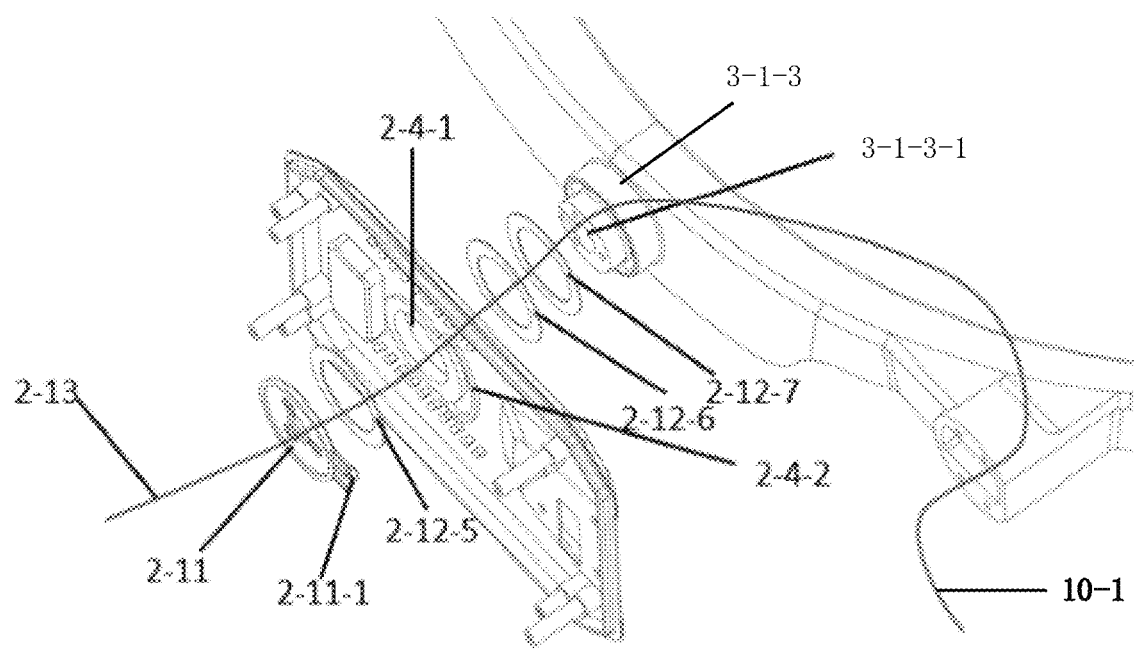
FIG. 13 schematically shows an exploded view of a sixth rotation shaft according to embodiments of the present disclosure.

FIG. 12 schematically shows an exploded view of a main control box unit according to embodiments of the present disclosure. FIG. 13 schematically shows an exploded view of a sixth rotation shaft according to embodiments of the present disclosure.

In some embodiments, the head-mounted display device also includes a main control box unit 2 and a sixth rotation shaft 6. The main control box unit 2 is used to shoot a picture and communicate with the display unit 5. The sixth rotation shaft 6 connects the main control box unit 2 and the connection unit 3. The main control box unit 2 is configured to rotate around the sixth rotation shaft 6 to adjust a shooting angle.

With reference to FIG. 12, the main control box unit 2 includes a front cover 2-1, a radiator 2-2, a middle housing 2-3, a rear cover 2-4, a hardware module 2-5, a fourth flexible trim 2-6, a first lens 2-7, a second lens 2-8, a first rubber plug 2-9 and a key pad 2-10. A main implementation of the main control box unit 2 includes image acquisition, remote communication, human-machine interaction, and information processing, etc. The radiator 2-2 is attached to a chip of a motherboard. Through efficient thermal conductivity, it disperses the heat of the chip, thereby preventing the chip from overheating and affecting an operation state of an entire machine. The hardware module 2-5 mainly includes: an infrared camera module, a visible light camera module, a WIFI module, a 4G/5G module, a motherboard module, a speaker, a microphone, buttons, and adapter FPC, etc. A lens 12-7 is a lens for a visible light camera, and the lens is made of ordinary transparent materials such as transparent PC, acrylic, and glass. A lens 22-8 is a lens for an infrared camera, and the lens is made of a customized material that penetrate specific light band, such as germanium glass. The first rubber plug 2-9 is a sealing plug for an SD card groove, which plays a role in dustproof and waterproof.

For example, when assembling the main control box unit 2, the key pad 2-10, the first lens 2-7, and the second lens 2-8 are respectively bonded to corresponding positions of the middle housing 2-3. The hardware module 2-5 is fixed to the back cover 2-4 with screws. Then, the middle housing 2-3 and the back cover 2-4 are assembled together, and the data line is led out through a fifth shaft hole 2-4-1. The radiator 2-2 is fastened to the middle housing 2-3 with screws. The front cover 2-1 is fixed to the middle housing 2-3 through a buckle. Finally, the first rubber plug 2-9 and the fourth flexible trim 2-6 are provided on corresponding positions of the main control box unit 2, and an assembly of the main control box unit is completed.

With reference to FIG. 13, the rear cover 2-4 may include a fifth shaft hole 2-4-1 and a third limiting groove 2-4-2. The sixth rotation shaft 6 mainly includes at least one of a third shaft cover 2-11, a fourth rotating shaft skeleton 3-1-3, and a fifth gasket 2-12-5, a sixth gasket 2-12-6, and a seventh gasket 2-12-7. Specifically, the data line 10-1 is used to across the fifth shaft hole 2-4-1 and enters the connection unit 3 through a central shaft hole of the fourth rotating shaft skeleton. The third shaft cover 2-11 includes a third limiting protrusion 2-11-1. During assembly, a third side of the fourth rotating shaft skeleton 3-1-3 is fixedly connected to the connection unit 3, and a fourth side is disposed with a third rotating shaft portion 3-1-3-1 (near the rear cover 2-4 and away from the connection unit 3). The third rotating shaft portion 3-1-3-1 across the fifth shaft hole 2-4-1, and the third limiting protrusion 2-11-1 of the third shaft cover 2-11 is clamped into the third limiting groove 2-4-2 of the rear cover 2-4 of the main control box to fit with each other. Then, at least one of the fifth gasket 2-12-5 and the sixth gasket 2-12-6 and the seventh gasket 2-12-7 is provided in a corresponding position. The third shaft cover 2-11, the rear cover 2-4, and the fourth rotating shaft skeleton 3-1-3 are connected together with screws, and a sixth rotation shaft 6 with an angle limitation is formed.

With reference to FIG. 13, the fifth gasket 2-12-5 is disposed between the third shaft cover 2-11 and the rear cover 2-4 (which may play a lubrication or damping adjustment role); and/or the sixth gasket 2-12-6 sleeved on the third rotating shaft portion 3-1-3-1 and used to lubricate and/or reduce noise when the main control box unit 2 rotates around the third rotating shaft portion 3-1-3-1; and/or the seventh gasket 2-12-7 sleeved on the third rotating shaft portion 3-1-3-1 and used to perform a damping adjustment when the main control box unit 2 rotates around the third rotating shaft portion 3-1-3-1. A position of the sixth gasket 2-12-6 and a position of the seventh gasket 2-12-7 may be interchanged.

According to embodiments of the present disclosure, the sixth rotation shaft 6 includes a rotating shaft rotating around an axis or a ball shaft rotating around any direction, where the axis is perpendicular to a line between pupils of two eyes. The main control box unit 2 and the connection unit 3 may be connected, so as to change a direction of image acquisition of the camera.

Specifically, the positions of the main control box unit 2 and the sixth rotation shaft 6 are not limited to those shown in FIG. 1 to FIG. 5. A connection position between the main control box unit 2 and the connection unit 3, and a connection position between the sixth rotation shaft 6 and the connection unit 3, may be moved according to actual needs, such as on a rear side of a helmet or on a side opposite to the rotating shaft arm unit 4.

Figure 14:
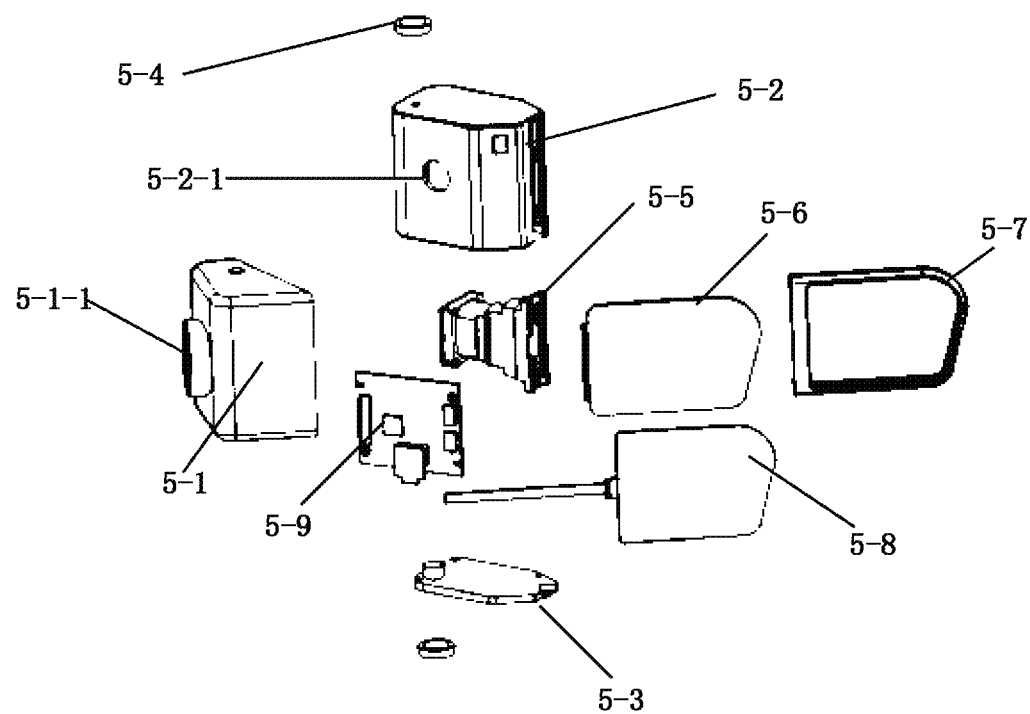
FIG. 14 schematically shows an exploded view of a display unit according to embodiments of the present disclosure.

FIG. 14 schematically shows an exploded view of a display unit according to embodiments of the present disclosure.

As shown in FIG. 14, the display unit 5 may be an optical machine unit. For example, the display unit 5 includes an adapter housing 5-1, an optical machine housing 5-2, a cover plate 5-3, a gasket 5-4, an optical machine 5-5, optical lenses 5-6, a lens housing 5-7, color changing lenses 5-8, and a Bridge plate 5-9. The optical machine 5-5 includes optical structural members, lens groups, and Micro OLED display modules. The optical machine structural members are high-precision structural members, which is required to ensure an assembly tolerance of the lens, generally less than 0.02 mm. The optical lenses 5-6 are optical waveguides for image display. The color changing lenses 5-8 may adjust a transmittance in real-time according to an ambient brightness, so as to ensure that an optical machine image may be viewed clearly in high brightness outdoor environments, thereby ensuring a display quality of the optical machine. Due to use of a multi-chip optical waveguide scheme in conjunction with Micro OLED modules, the optical machine is very compact and lightweight, with a weight of substantially 20 g (just for example).

In some embodiments, when assembling the display unit 5, the optical machine 5-5 and the optical machine lens 5-6 are first assembled together, and fixed with glue. The optical lenses 5-6 and the color changing lenses 5-8 are assembled together into the lens housing 5-7. The optical machine 5-5 and the color changing lens 5-8 are respectively connected to corresponding connectors of the Bridge plate 5-9. At the same time, a line led out through the sixth shaft hole 5-1-1 across through a hole 5-2-1 and is connected to the Bridge plate 5-9. Then, the optical machine 5-5 and the Bridge plate 5-9 are put into the optical machine housing 5-2, and the cover plate 5-3 is fixed with the optical machine housing 5-2 through screws. Finally, the gasket 5-4 is placed between the adapter housing 5-1 and the optical machine housing 5-2, and is connected to the adapter housing 5-1 and the optical machine housing 5-2 together through screws (such as fixed connection or rotatable connection), so as to complete the assembly.

In some embodiments, the display unit 5 includes a fifth rotation shaft (for example, disposed between the adapter housing 5-1 and the optical machine housing 5-2, not shown in the figure) for adjusting a display angle of the display unit 5 relative to the human eye during rotation. The fifth rotation shaft may include a rotating shaft rotating around an axis or a ball shaft rotating around any direction, where the axis is perpendicular to a line between pupils of two eyes. For example, when adjusting the display angle, the user may rotate the fifth rotation shaft (such as rotating the optical machine casing 5-2 around an axis of the gasket 5-4), so as to make an image displayed by the optical lens 5-6 move front and back or up and down relative to the human eye.

In some embodiments, the connection unit 3 may be worn and be in direct contact with a head of the user. The connection unit 3 has a shape matched with a contour of the head of the user, such as a circular head ring, a notched circular head ring, a strap, a headband, or a part of eye framework in contact with the head of the user.

In other embodiments, the head-mounted display device also includes a head-mounted object unit 1. The following further shows the head-mounted object unit 1 and connection unit 3 through FIG. 15 and FIG. 16.

Figure 15:
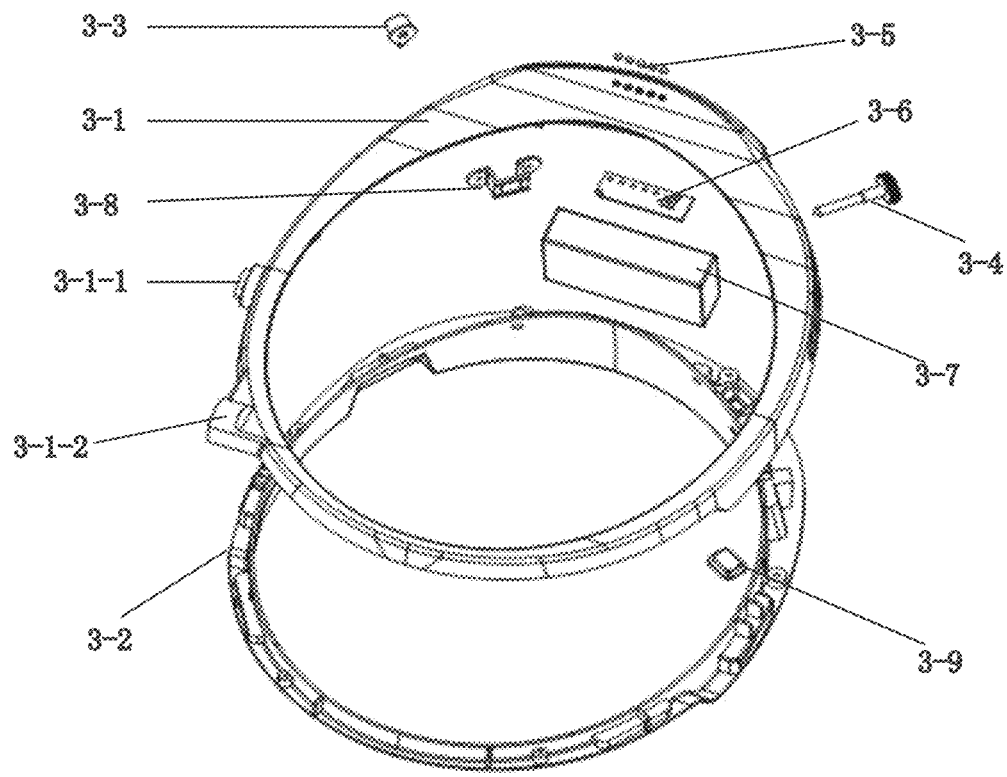
FIG. 15 schematically shows an exploded view of a connection unit according to embodiments of the present disclosure.
Figure 16:
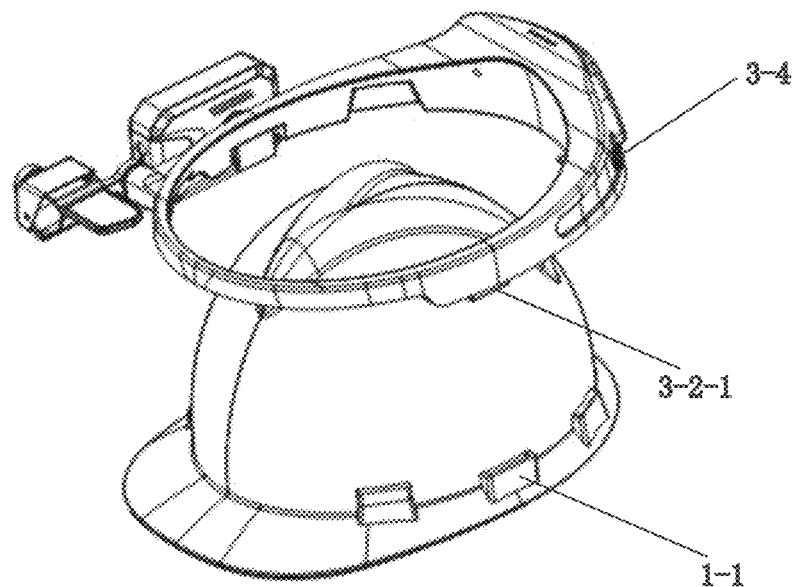
FIG. 16 schematically shows an assembly diagram of an annular headband and a helmet according to embodiments of the present disclosure.

FIG. 15 schematically shows an exploded view of a connection unit according to embodiments of the present disclosure. FIG. 16 schematically shows an assembly diagram of an annular headband and a helmet according to embodiments of the present disclosure.

With reference to FIG. 1 to FIG. 5, FIG. 15 and FIG. 16, in some embodiments, the connection unit 3 is used to connect to the head-mounted object unit 1. The head-mounted object unit 1 includes a hat type unit, such as a helmet. The connection unit 3 may be sleeved on the helmet when the connection unit 3 is an annular headband.

In some embodiments, the head-mounted object unit 1 has a shape that is suitable for the head of the user and is directly worn by the user on the head, and is not limited to a hat style. When the head-mounted object unit 1 has an overall shape that is suitable for the head of the user, it may be covered on a top of the head, such as a safety helmet, a helmet, or a head cover. When the head-mounted object unit 1 has a shape suitable for a forehead area of the user, it may have structures such as a head hoop or headband. When the head-mounted object unit 1 has a shape that is suitable for a facial area of the head of the user, it may be a fully covered mask structure or a mask structure that covers a portion of the facial area. In addition, the head-mounted object unit 1 may also include a clamping structure, such as a glasses leg type or having other clamping portions. In this case, a connection form between the connection unit 3 and the head-mounted object unit 1 is not limited to being sleeved on the head-mounted object unit 1.

For example, when the annular headband is sleeved on the head-mounted object unit 1, the user may wear the head-mounted object unit 1 on the head. With reference to FIG. 1 to FIG. 5, the head-mounted object unit 1 is in direct contact with the head of the user. A host unit 2 is connected to the connection unit 3 and is located on a side (left or right) of the head. The connection unit 3, which is disposed as a head loop, is located above the head of the user. An end of the rotating shaft arm unit 4 is connected to the connection unit 3, and the other end of the rotating shaft arm unit 4 is connected to the display unit 5. If the display unit 5 is in the position shown in FIG. 5 when worn by the user, the user may move the rotating shaft arm unit 5 to move the display unit 5 to a front of the face as shown in FIG. 1, such as a front side of eyes viewing the display unit 5. With continued reference to FIG. 9, it is possible that although the display unit 5 is already on the front side of the eyes of the user, it is not compatible with the pupil distance of the user. In this way, the user may adjust the display unit 5 to the front of the eyes of the user by bending the rotating shaft arm unit 5 to the left or right through at least one adjusting member of the rotating shaft arm unit 5.

Specifically, although FIG. 1 to FIG. 5 only show a single rotating shaft arm unit 4 and the display unit 5, at least one of the rotating shaft arm units 4 and the display unit 5 may be disposed as two when needed. For example, the display unit 5 is a dual optical machine and located in front of the eyes of the user. For another example, the rotating shaft arm unit 4 and the display unit 5, which are in the same structure, are added on another side of FIG. 1.

According to embodiments of the present disclosure, the head-mounted display device may be applied to an industrial field. For example, construction site users may wear safety helmets while using the display unit 5 to view the pictures. The pictures may be displayed based on display technologies such as AR, VR, MR, and XR. The annular headband design may achieve uniform weight distribution and improve user comfort when wearing. The assembly and disassembly of the safety helmet are very convenient, thereby making it convenient for later maintenance.

With reference to FIG. 15, the annular headband includes an upper housing 3-1, a lower housing 3-2, a power button 3-3, a fastener 3-4 (such as a fastening knob), a third lens 3-5, a power display plate 3-6, a rechargeable battery 3-7, a key bracket 3-8, and a second rubber plug 3-9. The fastener 3-4 serves to secure the annular headband and the safety helmet together. The rubber plug 3-9 is a sealing plug for a battery charging port, which provides protection for an interface terminal.

In some embodiments, when assembling the annular headband, the third lens 3-5 is glued onto the upper housing 3-1. The power button 3-3 and the button bracket 3-8 are fixed on the upper housing 3-1. The power display plate 3-6 is fixed in a corresponding position by screws. The rechargeable battery 3-7 is attached to the lower housing 3-2 through foam adhesive. The data line led out from the main control box 2 is threaded through the seventh shaft hole 3-1-1, where the power line is welded to the power switch, and the remaining line is threaded through the eighth shaft hole 3-1-2. The fifth shaft hole 2-4-1 and the seventh shaft hole 3-1-1 are assembled together through screws to form the sixth rotation shaft 6. Then, the upper housing 3-1 and the lower housing 3-2 are assembled and tightened with screws. Finally, the rubber plug 23-9 is provided on the lower housing 3-2 and the assembly of the headband is completed.

In some embodiments, a protrusion 3-2 of the annular headband is inserted into a groove 1-1 of the helmet through the lower housing 3-2. At this point, a relative position of the annular headband and the helmet has been determined. In some embodiments, when the annular headband is disposed on the helmet, the fastener 3-4 is used to across the annular headband to contact with the helmet.

In some embodiments, with reference to FIG. 1 to FIG. 16, the head-mounted display device proposed in one or more of the aforementioned embodiments may be used in conjunction with a helmet. The head-mounted display device may include a main control box unit 2, a connection unit 3, a rotating shaft arm unit 4, and a display unit 5. By connecting each unit through three rotation shafts, a multi-degree of freedom adjustment of the display unit 5 is achieved. Specifically, the multi-rotating shaft design makes the display unit 5 easy to store and may switch usage states as desired. When in use, the display unit 5 is in the state shown in FIG. 1. When not in use, the display unit 5 may be folded over the helmet, as shown in FIG. 5. When providing the rotating shaft, a lubricating gasket and a damping gasket may be added. A material of the lubricating gasket may be POM, which plays a role in self-lubricating and eliminating friction noise. A material of the damping gasket may be rubber, which plays a role in damping adjustment. In this way, it is possible to achieve smooth and damped shaft adjustment. By utilizing the headband design of the connection unit 3, the weight is evenly distributed, and the assembly and disassembly with the helmet are very convenient, so that later maintenance is very convenient. The rotating shaft arm unit 4 may be adjusted for people with different pupil distances, so as to achieve a better display effect.

In some embodiments, the head-mounted display device may be used as AR glasses for industrial purposes, with compact optical machine, lightweight overall appearance, and elegant appearance. The AR glasses, combined with hardware and software applications, may achieve functions such as remote assistance, voice interaction, infrared temperature measurement, etc. In this way, there is a very broad application prospect in a field of smart factories.

It may be understood that the above embodiments are only exemplary embodiments adopted to illustrate principles of the present disclosure. However, the present disclosure is not limited to this. For those of ordinary skill in the art, various variations and improvements may be made without departing from the spirit and essence of the present disclosure, and these variations and improvements are also considered the scope of protection of the present disclosure.

What is claimed is:
1. A head-mounted display device, comprising:
a display unit configured to display a picture;
a connection unit configured to position the display unit in front of at least one eye of a user as the head-mounted display device is worn on a head of the user; and
a rotating shaft arm unit, comprising at least a first segment, a second segment, and a first adjusting member connecting the first segment and the second segment, wherein the first segment is connected to the connection unit, and the first adjusting member is configured to change a position of one of the first segment or the second segment with respect to the other one of the first segment or the second segment when the first adjusting member is subjected to an external force, so that the second segment drives the display unit to move to achieve a pupil distance adjustment,
wherein the rotating shaft arm unit further comprises a third segment, and the second segment is connected to the display unit through the third segment,
wherein the rotating shaft arm unit further comprises a second adjusting member, the second adjusting member is connected between the second segment and the third segment, and the second adjusting member is configured to change a position of one of the second segment or the third segment with respect to the other one of the second segment or the third segment when the second adjusting member is subjected to an external force, so that the third segment drives the display unit to move to achieve a pupil distance adjustment,
wherein the first adjusting member is a flexible member, and/or the second adjusting member is a flexible member,
wherein the first adjusting member is a flexible metal member, the first segment comprises a first rigid skeleton, the second segment comprises a second rigid skeleton, the rotating shaft arm unit further comprises a first flexible trim, and the first adjusting member is configured to across a through hole inside the first flexible trim to connect the first rigid skeleton and the second rigid skeleton.

2. The head-mounted display device of claim 1, wherein the second adjusting member is a flexible metal member, the third segment comprises a third rigid skeleton, the rotating shaft arm unit further comprises a second flexible trim, and the second adjusting member is configured to across a through hole inside the second flexible trim to connect the second rigid skeleton and the third rigid skeleton.

3. The head-mounted display device of claim 2, wherein the rotating shaft arm unit further comprises a third flexible trim, a first end of the third flexible unit is connected to the first rigid skeleton, a second end of the third flexible unit is connected to the third rigid skeleton, and a middle portion between the first end and the second end is connected to the second rigid skeleton.

4. The head-mounted display device of claim 3, further comprising:
 a third rotation shaft configured to connect the connection unit and the rotating shaft arm unit, wherein the rotating shaft arm unit is configured to rotate around the third rotation shaft to adjust a position of the rotating shaft arm unit with respect to the connection unit.

5. The head-mounted display device of claim 4, wherein the first segment comprises a second shaft hole and a first limiting groove, and the third rotation shaft comprises:
 a first shaft cover comprising a first limiting protrusion, wherein the first limiting protrusion is matched with the first limiting groove; and
 a second rotating shaft skeleton comprising a first side and a second side, wherein a first rotating shaft portion is provided on the second side, wherein the first side is connected to the connection unit, and the first rotating shaft portion is configured to be connected to the first shaft cover through the second shaft hole.

6. The head-mounted display device of claim 5, wherein the third rotation shaft further comprises:
 a first gasket sleeved on the first rotating shaft portion, and configured to lubricate and/or reduce noise when the first segment rotates around the first rotating shaft portion; and/or
 a second gasket sleeved on the first rotating shaft portion, and configured to perform a damping adjustment when the first segment rotates around the first rotating shaft portion.

7. The head-mounted display device of claim 4, further comprising:
 a fourth rotation shaft configured to connect the rotating shaft arm unit and the display unit, wherein the rotating shaft arm unit is configured to rotate around the fourth rotation shaft to adjust a position of the rotating shaft arm unit with respect to the display unit.

8. The head-mounted display device of claim 7, wherein the third segment of the rotating shaft arm unit comprises a third shaft hole and a second limiting protrusion, a transfer housing of the display unit comprises a fourth shaft hole and a second limiting groove, and the fourth rotation shaft comprises:
 a second shaft cover; and
 a third rotating shaft skeleton comprising a second rotating shaft portion, wherein the second rotating shaft portion is connected to the second shaft cover through the third shaft hole and the fourth shaft hole, and the second limiting protrusion is matched with the second limiting groove.

9. The head-mounted display device of claim 8, wherein the fourth rotation shaft further comprises:
 a third gasket sleeved on the second rotating shaft portion and configured to lubricate and/or reduce noise when the third segment rotates around the second rotating shaft portion; and/or
 a fourth gasket sleeved on the second rotating shaft and configured to perform a damping adjustment when the third segment rotates around the second rotating shaft portion.

10. The head-mounted display device of claim 7, further comprising:
 a main control box unit configured to shoot a picture and communicate with the display unit; and
 a sixth rotation shaft connecting the main control box unit and the connection unit, wherein the main control box unit is configured to rotate around the sixth rotation shaft to adjust a shooting angle.

11. The head-mounted display device of claim 10, wherein a rear cover of the main control box unit comprises a third limiting groove and a fifth shaft hole, and the sixth rotation shaft comprises:
 a third shaft cover comprising a third limiting protrusion, wherein the third limiting protrusion is matched with the third limiting groove; and
 a fourth rotating shaft skeleton comprising a third side and a fourth side, wherein a third rotating shaft portion is provided on the fourth side, wherein the third side is connected to the connection unit, and the third rotating shaft portion is configured to be connected to the third shaft cover through a fifth shaft hole.

12. The head-mounted display device of claim 11, wherein the sixth rotation shaft further comprises:
 a fifth gasket disposed between the third shaft cover and the rear cover; and/or
 a sixth gasket sleeved on the third rotating shaft portion, and configured to lubricate and/or reduce noise when the main control box unit rotates around the third rotating shaft portion; and/or
 a seventh gasket sleeved on the third rotating shaft portion, and configured to perform a damping adjustment when the main control box unit rotates around the third rotating shaft portion.

13. The head-mounted display device of claim 1, wherein the first adjusting member is a rotation shaft, and/or the second adjusting member is a rotation shaft.

14. The head-mounted display device of claim 13, wherein the first adjusting member or the second adjusting member is a rotating shaft rotating around an axis or a ball shaft rotating around any direction, wherein the axis is perpendicular to a line between pupils of two eyes.

15. The head-mounted display device of claim 1, further comprising a head-mounted object unit, wherein:
 the connection unit comprises an annular headband, and the annular headband is configured to be sleeved on the head-mounted object unit.

16. The head-mounted display device of claim 15, wherein the head-mounted object unit comprises a helmet, and a protrusion of the annular headband is inserted into a groove of the helmet,
 wherein the connection unit further comprises a fastener, and when the annular headband is sleeved on the helmet, the fastener is configured to extend across the annular headband to contact the helmet.

* * * * *